(No Model.)
P. F. CLOSE.
CORN PLANTER.
No. 463,484. Patented Nov. 17, 1891.
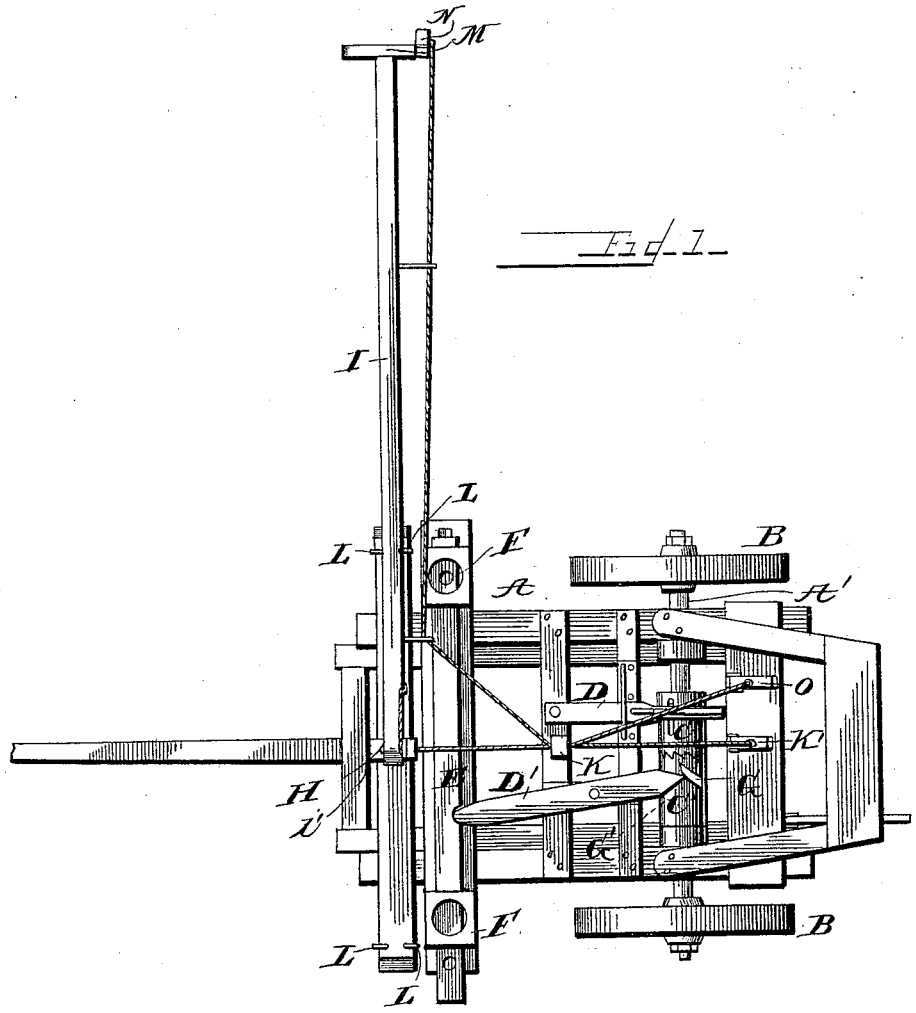
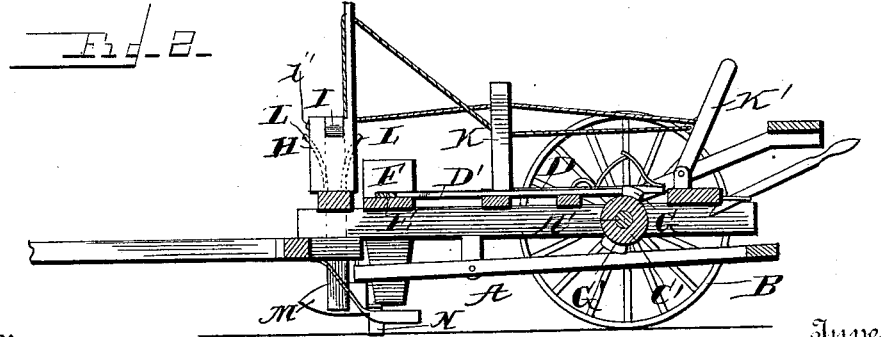
Witnesses  Inventor
Perry F. Close
by Harry Sperling & Sons Attorneys

UNITED STATES PATENT OFFICE.

PERRY F. CLOSE, OF LAKE CRYSTAL, MINNESOTA.

CORN-PLANTER.

SPECIFICATION forming part of Letters Patent No. 463,484, dated November 17, 1891.

Application filed April 6, 1891. Serial No. 387,795. (No model.)

*To all whom it may concern:*

Be it known that I, PERRY F. CLOSE, a citizen of the United States, residing at Lake Crystal, in the county of Blue Earth and State of Minnesota, have invented certain new and useful Improvements in Corn-Planters, of which the following is a specification.

My invention relates to improvements in that class of corn-planters in which the planting or dropping of the corn is accomplished by means of ratchet-wheels secured upon the driving-axle at the rear end of the machine; and it has for its object to drop the corn equal distances apart in opposite directions in the field.

To this end the invention consists in the novel construction and arrangement of the several parts, as will be hereinafter more fully described and specifically claimed.

In the accompanying drawings, to which reference is had and which fully illustrates my invention, Figure 1 is a top or plan view of my improved corn-planter, and Fig. 2 is a longitudinal section of same.

A indicates a substantial rectangular frame mounted with the driving-axle A' upon the driving-wheels B B. Upon this driving-axle A' are secured two ratchet-wheels C C', rotating thereon, which can be slid on shaft, so as to slide in and out of gear with C' by means of a shifting lever D, as shown in Fig. 1. C, when the two wheels are in their normal position—*i. e.*, are geared together—becomes stationary on the axle-shaft.

D' indicates a lever, one end of which is attached to a dropping-slide E. This lever is fulcrumed upon the frame of the machine, so that it can move as on a pivot. On the ratchet-wheel C', at each side, are secured two small diamond-shaped blocks G G', so that when the ratchet-wheel C' rotates the end of the lever D' moves to the right and left at one revolution of the ratchet-wheel C', which reciprocates the dropping-slide E, thus dropping the corn from boxes F F in both directions. This lever D', having beveled edges formed near its end of about forty-five degrees, presenting a point at the extreme end of said lever, so that when the ratchet-wheel C' rotates the point of lever D' contacts with G' and is reciprocated to the left and right during each revolution of the ratchet-wheel C', which in turn reciprocates the dropping-slide E at each revolution of the axle-shaft and ratchet-wheel C', thereby dropping two rows of corn in the hills at each revolution of the two driving-wheels, which are stationary on the shaft the distance of the boxes F F, the ratchet-wheel C' being of equal distance from the boxes, so that the corn will be dropped an equal distance apart in both directions.

H indicates a short post or standard secured centrally at its lower end to the outer cross-beam on the front of the frame, its upper or free end being bifurcated or mortised to receive one end of a marker-rod I, which is pivotally secured in the mortise by a pivot *i'*, so that on one end a rope secured to the marker I near *i'* and passing back through a hole in the extension or top of the standard H and through a hole in the post or standard K to a lever K', secured to the rear beam on the rear end of the frame. By such an arrangement, when lever K' is moved from front to rear it will throw the marker I from one side of the machine to the opposite side to mark each side of the machine.

L L L L indicate four short stationary rods running parallel with each other and having their lower ends secured in each end of the forward cross-beam in the forward end of the machine. The upper or free ends of these rods are turned or bent outwardly from each other, so as to receive and securely hold the end of the marker I in its proper place upon either side of the machine.

M indicates a shoe secured to the outer or free end of the marker I, which is designed to mark the place to drive the center of the machine, the horses to be driven on either side of the mark. The length of the marker I governs the distance between the rows, and is twice as long as the distance between the boxes F F.

N indicates a weight secured to the shoe upon the outer end of the marker I, with one end of a rope attached to it, and which runs parallel with the marker, as indicated in Fig. 1 of the drawings, and said rope passes through a hole in the upper end of the short standard K, the lower end of which is secured to a central cross-beam of the frame to a lever O, the lower end of which is secured to the rear cross-beam at the rear part of the frame by holding lever O down and by means of said rope being secured to the weight N and lever O. While lever O is down the weight N is raised, and by removing lever O from the beam at the time the last hills are dropped into at the end of rows the weight N will drop and make a mark directly opposite the hills last dropped as a guide to drop on commencing the returning rows, and be in direct line of the last two hills dropped at the end of the former two rows, and so on repeatedly across the field.

The operator can readily and conveniently operate this machine from his seat. The machine is simple in its construction, easily operated, durable, and cheaply manufactured.

From the foregoing description, taken in connection with the accompanying drawings, the operation of my machine will be obvious.

Having thus described my invention, what I claim as new, and desire to secure by Letters Patent, is—

The combination, with the marker-rod I and its shoe M, of a weight N, levers O and K', fulcrumed upon the frame, guide-posts H and K, and ropes connecting for operating the weight, substantially as described.

In witness whereof I have hereunto set my hand in the presence of two witnesses.

PERRY F. CLOSE.

Witnesses:
GEORGE W. BRONG,
W. H. CLOSE.